US012682107B2

(12) United States Patent
D'Agostino

(10) Patent No.: US 12,682,107 B2
(45) Date of Patent: *Jul. 14, 2026

(54) SYSTEM AND METHOD FOR PROCESSING INSTRUCTIONS ASSOCIATED WITH ONE OR MORE DATA TRANSFERS

(71) Applicant: The Toronto-Dominion Bank, Toronto (CA)

(72) Inventor: Dino Paul D'Agostino, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 125 days.

This patent is subject to a terminal disclaimer.

(21) Appl. No.: 18/606,984

(22) Filed: Mar. 15, 2024

(65) Prior Publication Data

US 2024/0220653 A1      Jul. 4, 2024

Related U.S. Application Data

(63) Continuation of application No. 17/220,061, filed on Apr. 1, 2021, now Pat. No. 11,966,491.

(51) Int. Cl.
*G06F 21/62* (2013.01)
*G06F 21/44* (2013.01)
(Continued)

(52) U.S. Cl.
CPC .......... *G06F 21/6245* (2013.01); *G06F 21/44* (2013.01); *G06F 40/279* (2020.01);
(Continued)

(58) Field of Classification Search
CPC .......... G06F 21/30; G06F 21/44; G06F 21/60; G06F 21/62; G06F 21/6218;
(Continued)

(56) References Cited

U.S. PATENT DOCUMENTS

| 6,442,592 B1 | 8/2002 | Alumbaugh et al. |
| 9,536,232 B2 | 1/2017 | Dorsey et al. |
(Continued)

FOREIGN PATENT DOCUMENTS

EP          1026644 A1      8/2000

OTHER PUBLICATIONS

U.S. Appl. No. 17/220,061, Final office action dated Jun. 9, 2023.
(Continued)

*Primary Examiner* — D'Arcy Winston Straub
(74) *Attorney, Agent, or Firm* — Borden Ladner Gervais LLP

(57) ABSTRACT

Messaging servers, methods and storage media for processing instructions associated with one or more data transfers are disclosed. Exemplary implementations may: assign, by a messaging server and in response to authentication of a computing device, a conversation authentication identifier to a first unauthenticated message received from the computing device; analyze, by the messaging server, a subsequent unauthenticated message from the computing device to determine that the subsequent unauthenticated message is associated with the one or more data transfers; and automatically assign, by the messaging server, the same conversation authentication identifier to the subsequent unauthenticated message that is determined to be associated with the one or more data transfers. A system may authenticate and unify received messages to securely process data transfer instructions, for example from existing email clients. A natural language processing engine may determine at least one unambiguous intent associated with performance of the one or more data transfers.

20 Claims, 4 Drawing Sheets

(51) Int. Cl.

| | |
|---|---|
| *G06F 40/279* | (2020.01) |
| *H04L 51/18* | (2022.01) |
| *H04L 51/216* | (2022.01) |
| *H04L 51/56* | (2022.01) |
| *G06F 40/30* | (2020.01) |

(52) U.S. Cl.

CPC ............ *H04L 51/18* (2013.01); *H04L 51/216* (2022.05); *H04L 51/56* (2022.05); *G06F 40/30* (2020.01)

(58) Field of Classification Search

CPC .... G06F 21/6245; G06F 40/20; G06F 40/279; G06F 40/30; H04L 51/07; H04L 51/18; H04L 51/21; H04L 51/216; H04L 51/56

See application file for complete search history.

(56) References Cited

U.S. PATENT DOCUMENTS

| | | | |
|---|---|---|---|
| 9,904,924 B1 | 2/2018 | Dorsey et al. | |
| 10,404,630 B1 | 9/2019 | Dodelin et al. | |
| 10,438,182 B2 | 10/2019 | Killoran, Jr. | |
| 10,552,817 B2 | 2/2020 | Green et al. | |
| 10,630,840 B1* | 4/2020 | Karp | G06N 5/04 |
| 2009/0240774 A1* | 9/2009 | Sachtjen | H04L 51/04 |
| | | | 709/206 |
| 2012/0072723 A1* | 3/2012 | Orsini | G06F 21/6218 |
| | | | 713/165 |
| 2014/0279444 A1 | 9/2014 | Kassemi et al. | |
| 2015/0188854 A1* | 7/2015 | Tomkins | G06F 16/68 |
| | | | 709/206 |
| 2018/0114127 A1* | 4/2018 | Cole | H04L 67/52 |
| 2018/0262484 A1* | 9/2018 | Kesari | H04L 51/42 |
| 2019/0287092 A1 | 9/2019 | Cozens et al. | |
| 2020/0296082 A1 | 9/2020 | Killoran, Jr. et al. | |
| 2020/0366628 A1* | 11/2020 | Olivera | G06Q 10/107 |

OTHER PUBLICATIONS

U.S. Appl. No. 17/220,061, Non-Final office action dated Jan. 24, 2023.

U.S. Appl. No. 17/220,061, Notice of Allowance dated Dec. 15, 2023.

Canadian Patent Application No. 3113997 Office Action dated Mar. 25, 2025.

\* cited by examiner

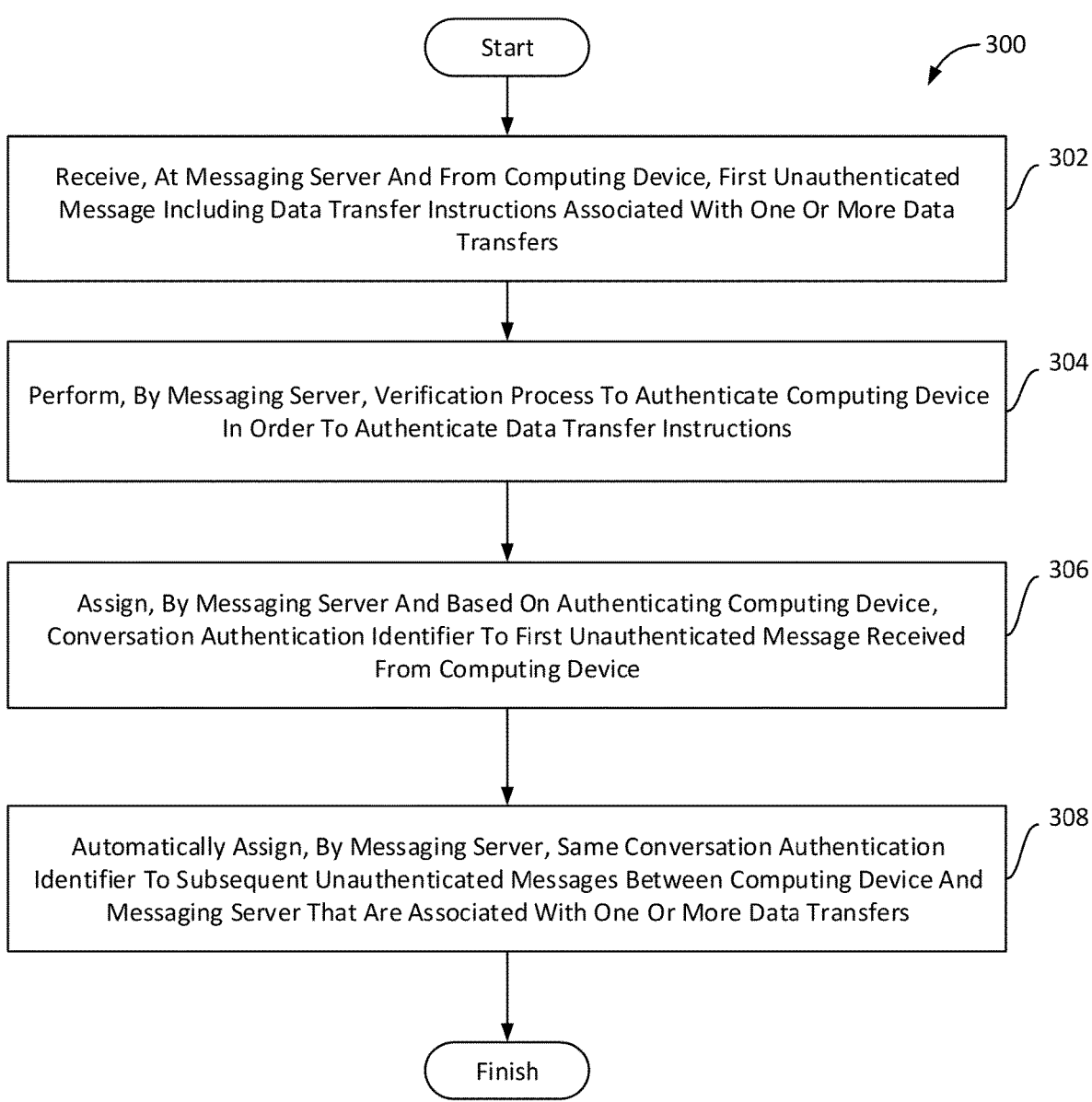

Start

300

Receive, At Messaging Server And From Computing Device, First Unauthenticated Message Including Data Transfer Instructions Associated With One Or More Data Transfers

302

Perform, By Messaging Server, Verification Process To Authenticate Computing Device In Order To Authenticate Data Transfer Instructions

304

Assign, By Messaging Server And Based On Authenticating Computing Device, Conversation Authentication Identifier To First Unauthenticated Message Received From Computing Device

306

Automatically Assign, By Messaging Server, Same Conversation Authentication Identifier To Subsequent Unauthenticated Messages Between Computing Device And Messaging Server That Are Associated With One Or More Data Transfers

308

Finish

FIG. 3

SYSTEM AND METHOD FOR PROCESSING INSTRUCTIONS ASSOCIATED WITH ONE OR MORE DATA TRANSFERS

CROSS-REFERENCE TO RELATED APPLICATIONS

This application is a continuation of U.S. patent application Ser. No. 17/220,061, filed Apr. 1, 2021, the entirety of which is hereby incorporated by reference.

FIELD

The present disclosure relates to transfers of data, including but not limited to computing platforms, methods, and storage media for processing instructions associated with one or more data transfers.

BACKGROUND

Messaging systems, such as email, texting or short messaging service (SMS) messaging, are used as a mechanism for communication. One purpose of such communication is to simply exchange correspondence or carry on a conversation. Another purpose is to provide instructions for different types of data transfers. Sending instructions for some types of data transfers can often span more than one message from a message initiator, such as a customer.

Some messaging systems require users to use a specific proprietary platform. Messaging systems can include dedicated messaging apps and chat applications, or social messaging, where messaging is a subset of a social media or other app or platform.

In contrast, email is an example of a more open platform that allows a user to use different email clients. Email is extremely convenient and familiar to many users, but inherently transmits messages that are unauthenticated. Accordingly, there is no easy way to verify users or customers, making email currently unsuitable for some types of communication including instructions for a data transfer.

Improvements in approaches for processing instructions associated with one or more data transfers are desirable.

SUMMARY

One aspect of the present disclosure relates to a messaging server configured for processing instructions associated with one or more data transfers. The messaging server may include a non-transient computer-readable storage medium having executable instructions embodied thereon. The messaging server may include one or more hardware processors configured to execute the instructions. The processor(s) may execute the instructions to receive, at the messaging server and from a computing device, a first unauthenticated message including data transfer instructions associated with the one or more data transfers. The processor(s) may execute the instructions to perform, by the messaging server, a verification process to authenticate the computing device in order to authenticate the data transfer instructions. The processor(s) may execute the instructions to assign, by the messaging server and based on authenticating the computing device, a conversation authentication identifier to the first unauthenticated message received from the computing device. The processor(s) may execute the instructions to automatically assign, by the messaging server, the same conversation authentication identifier to subsequent unauthenticated messages between the computing device and the messaging server that are associated with the one or more data transfers.

Another aspect of the present disclosure relates to a method for processing instructions associated with one or more data transfers. The method may include receiving, at a messaging server and from a computing device, a first unauthenticated message including data transfer instructions associated with the one or more data transfers. The method may include performing, by the messaging server, a verification process to authenticate the computing device in order to authenticate the data transfer instructions. The method may include assigning, by the messaging server and based on authenticating the computing device, a conversation authentication identifier to the first unauthenticated message received from the computing device. The method may include automatically assigning, by the messaging server, the same conversation authentication identifier to subsequent unauthenticated messages between the computing device and the messaging server that are associated with the one or more data transfers.

Yet another aspect of the present disclosure relates to a non-transient computer-readable storage medium having instructions embodied thereon, the instructions being executable by one or more processors to perform a method for processing instructions associated with one or more data transfers. The method may include receiving, at a messaging server and from a computing device, a first unauthenticated message including data transfer instructions associated with the one or more data transfers. The method may include performing, by the messaging server, a verification process to authenticate the computing device in order to authenticate the data transfer instructions. The method may include assigning, by the messaging server and based on authenticating the computing device, a conversation authentication identifier to the first unauthenticated message received from the computing device. The method may include automatically assigning, by the messaging server, the same conversation authentication identifier to subsequent unauthenticated messages between the computing device and the messaging server that are associated with the one or more data transfers.

BRIEF DESCRIPTION OF THE DRAWINGS

Embodiments of the present disclosure will now be described, by way of example only, with reference to the attached Figures.

FIG. 3 illustrates a method or process for processing instructions associated with one or more data transfers, in accordance with one or more embodiments.

DETAILED DESCRIPTION

Figure 1:
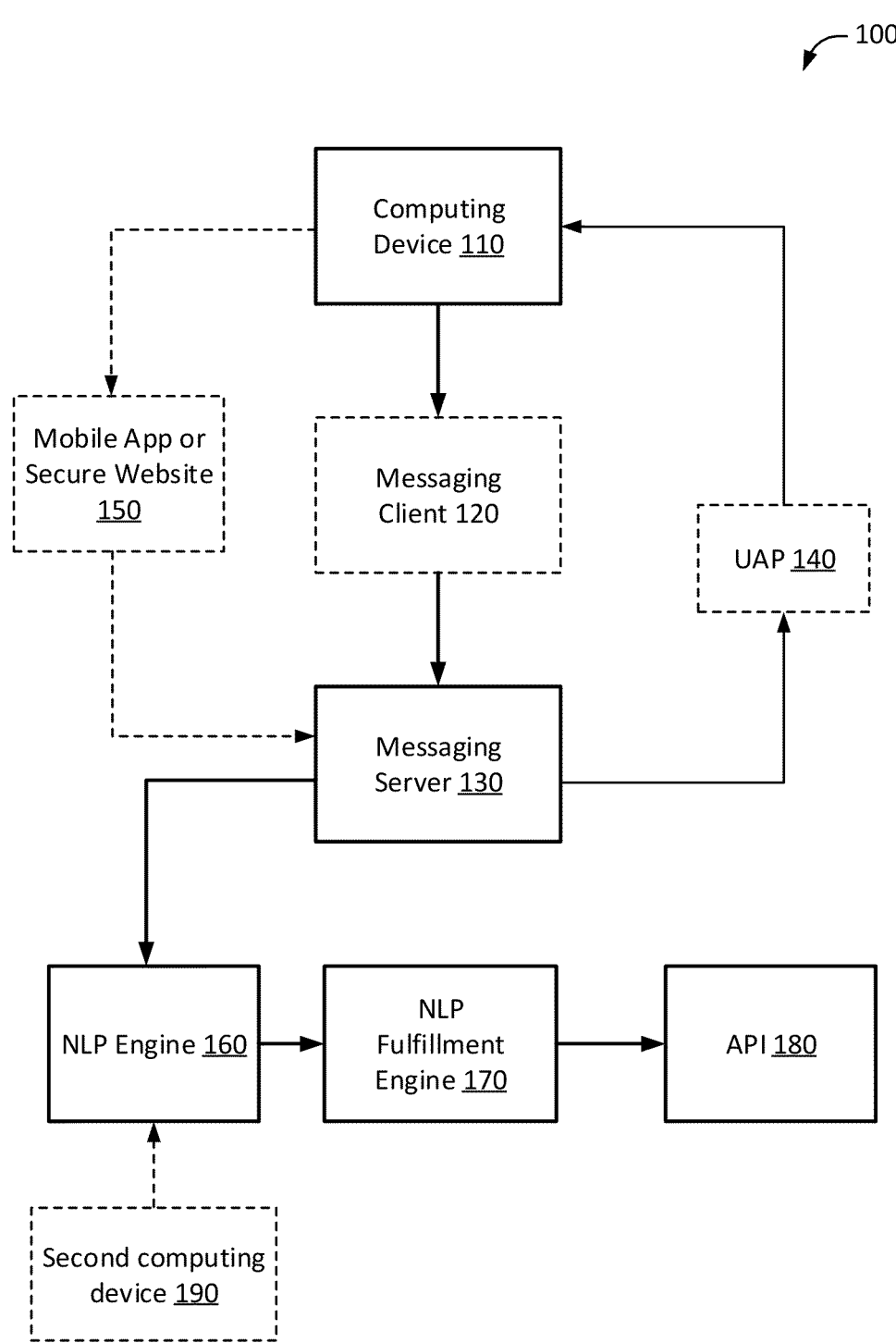
FIG. 1 illustrates a system configured for processing instructions associated with one or more data transfers, in accordance with one or more embodiments.

Messaging servers, methods and storage media for processing instructions associated with one or more data transfers are disclosed. Exemplary implementations may: receive, at a messaging server and from a computing device, a first unauthenticated message including data transfer instructions associated with the one or more data transfers; perform, by the messaging server, a verification process to authenticate the computing device in order to authenticate the data transfer instructions; assign, by the messaging server and based on authenticating the computing device, a conversation authentication identifier to the first unauthenticated message received from the computing device; and automatically assign, by the messaging server, the same conversation authentication identifier to subsequent unauthenticated messages between the computing device and the messaging server that are associated with the one or more data transfers. A system may authenticate and unify received messages to securely process data transfer instructions, for example from existing email clients.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 illustrates a system 100 configured for processing instructions associated with one or more data transfers, in accordance with one or more embodiments. The one or more data transfers may be any type of transfer of data from a first computing device to a second computing device, and may be characterized by data transfer instructions. The data transfer instructions may include a source, a destination and a data payload. One example of a data transfer is a secure file transfer from a sender to a recipient, for example sending a sensitive document. Another example of a data transfer is a financial transaction involving a sender account and a recipient account, a transaction type and a transaction amount. In some instances, one or more messages include(s) instructions relating to one or more data transfers.

The system 100 includes a computing device 110, such as a computing device associated with an initiator of the one or more data transfers, for example a customer. In an example embodiment, the computing device 110 is in communication with a messaging client 120, for example an email client, to convey a message to a messaging server 130, where the message includes data transfer instructions associated with the one or more data transfers. The messaging client 120 and the messaging server 130 may comprise a messaging system. Some examples of messaging systems include dedicated messaging apps and chat applications, such as Facebook Messenger, WhatsApp, WeChat, Telegram, Viber, Line, Snapchat, Discord, iMessage, Slack, and Kik Messenger. Other examples include social messaging, where messaging is a subset of a social media or other app or platform, such as Instagram, Reddit, Tumblr, TikTok, Twitter, or an app with another specific function or purpose. Further examples include texting or SMS messaging.

In an example embodiment, the message comprises a first unauthenticated message, for example an email message. The unauthenticated message may be a message originating from a messaging service in which a user is not authenticated prior to message sending or message receipt, such as an email message, a text or SMS message. A challenge associated with unauthenticated messages is that it is difficult to verify the user. This generally leads to unauthenticated messages not being used for sending private information, sensitive information, or data transfer instructions.

Messaging server 130 may comprise an email server, or a server for a proprietary messaging service. Messaging server 130 may be in communication with a backend system configured to execute the one or more data transfers, or may be associated with an institution instructed to execute the one or more data transfers, such as a financial institution when the data transfer comprises a financial transaction.

In an example embodiment, the messaging server 130 is in communication with a unified authentication platform (UAP) 140, which communicates with the customer for authentication, for example to ask for push notification, or a one-time-password (OTP). In addition, or alternatively, the customer may use the computing device 110 to access a mobile app or secure website 150 to provide user authentication, such as by logging in or retrieving a code after logging in.

In an example embodiment, the messaging server 130 is configured for processing instructions associated with one or more data transfers. The messaging server 130 may include a non-transient computer-readable storage medium having executable instructions embodied thereon. The messaging server 130 may include one or more hardware processors configured to execute the instructions. The processor(s) may execute the instructions to receive, at the messaging server 130 and from the computing device 110, a first unauthenticated message including data transfer instructions associated with the one or more data transfers. The processor(s) may execute the instructions to perform, by the messaging server 130, a verification process to authenticate the computing device 110 in order to authenticate the data transfer instructions. The processor(s) may execute the instructions to assign, by the messaging server 130 and based on authenticating the computing device 110, a conversation authentication identifier to the first unauthenticated message received from the computing device 110. The processor(s) may execute the instructions to automatically assign, by the messaging server 130, the same conversation authentication identifier to subsequent unauthenticated messages between the computing device 110 and the messaging server 130 that are associated with the one or more data transfers.

As outlined above, messaging server 130 assigns a conversation authentication identifier to the first unauthenticated message between the computing device 110 and the messaging server 130 that includes data transfer instructions associated with one or more data transfers. The conversation authentication identifier may serve to identify that the first unauthenticated message has now been authenticated, and that it is associated with the one or more data transfers. The messaging server then assigns the same conversation authentication identifier to subsequent unauthenticated messages between the computing device 110 and the messaging server 130 that are associated with the one or more data transfers. In so doing, the conversation authentication identifier assigned by the messaging server 130 imparts on each of the subsequent unauthenticated messages an authentication as well as an association with the same one or more data transfers. Accordingly, a customer may send a number of unauthenticated messages, for example a series or thread of email messages, relating to the same one or more data transfers. The messaging server 130 will determine or know based on the assigned conversation authentication identifier that the messages relate to the same data transfers, and that the messages are all authenticated. In this way, a customer verification process may be used to authenticate and unify the messages, to enable the messaging server 130 to securely process the data transfer instructions, for example using existing email clients.

In an example embodiment, the system employs natural language processing (NLP) to enable understanding via intent and entity extraction, and execution of intents and entities to fulfill customer data transfer needs, such as financial transaction needs. The intents refer to what the data transfer is intended to be, e.g. send a secure file, check an account balance, move money from one account to another account. The entities comprise an identification or definition of the entities involved in the data transfer or transaction.

Computing device 110 may send data transfer instructions, for example via email. NLP engine 160, in communication with the messaging server 130, processes one or more messages with received data transfer instructions and carries on a conversation with the customer via the computing device 110. The message(s) include(s) instructions relating to one or more data transfers. NLP engine 160 may parse or break-down the instruction(s) into separate intents and entities, and automatically create separate data transfer instructions for each intent. Known NLP engines, such as those used in a dedicated online or voice chat session with an authenticated customer, are only single intent based. For example, a current NLP engine can process an instruction such as "Transfer $ from A to B", but cannot process a more complex instruction, or a set of composite instructions, such as "send $500 from my bank account to my daughter who is in school, and in addition to that . . . , and in addition to that . . . ".

According to an example embodiment, training of NLP engine 160 includes one intent and multiple entities. In another embodiment, NLP engine 160 is configured to use a pre-processor to break apart sentence structures and paragraphs to create separate transaction instructions for each intent. In an implementation, composite transaction instructions may include multiple sentences that all relate to the same intent. For example, one sentence says who to send to, the other gives recipient's email address, then additional details. NLP engine 160 interprets the text to identify the number of intents and entities. Natural language synthesis may be used to take a paragraph and understand what is really being asked, or perform text summarization. In an example embodiment, NLP engine 160 is trained to respond to complex conversations, taking apart the sentence structure and break it up into intents and entities.

Approaches in the market today are single intent based (transfer $ from A to B), and most engines only understand that. Embodiments of the present disclosure use an underlying method to break apart the sentence structures, to part of speech analysis, and identify: how many things the client wants to do; break each into a separate task; and call other systems, such as NLP fulfillment engine 170 and API 180, for each task separately to process/fulfill.

Also illustrated in FIG. 1 is the optional involvement of a second computing device 190, for example associated with an organization involved in the data transfer, to assist if the NLP engine is unable to complete the process on its own.

For example, if there remains at least one ambiguous intent after processing by NLP engine 160 and NLP fulfillment engine 170, a process or person associated with the second computing device 190 may be consulted to resolve the ambiguity. This resolution may be performed in part by contacting the customer via the computing device 110 and requesting confirmation to resolve at least one ambiguous parameter. An example is a bank employee contacting the customer by phone and asking the customer for clarification. After the at least one ambiguous parameter has been resolved, the second computing device 190 may provide an unambiguous parameter (corresponding to what was formerly the at least one ambiguous parameter) to return the process to the NLP engine 160 after resolving any ambiguity. In another implementation, the computing device 110 provides additional details based on the interaction with the second computing device 190 and a person associated with the second computing device.

Figure 2:
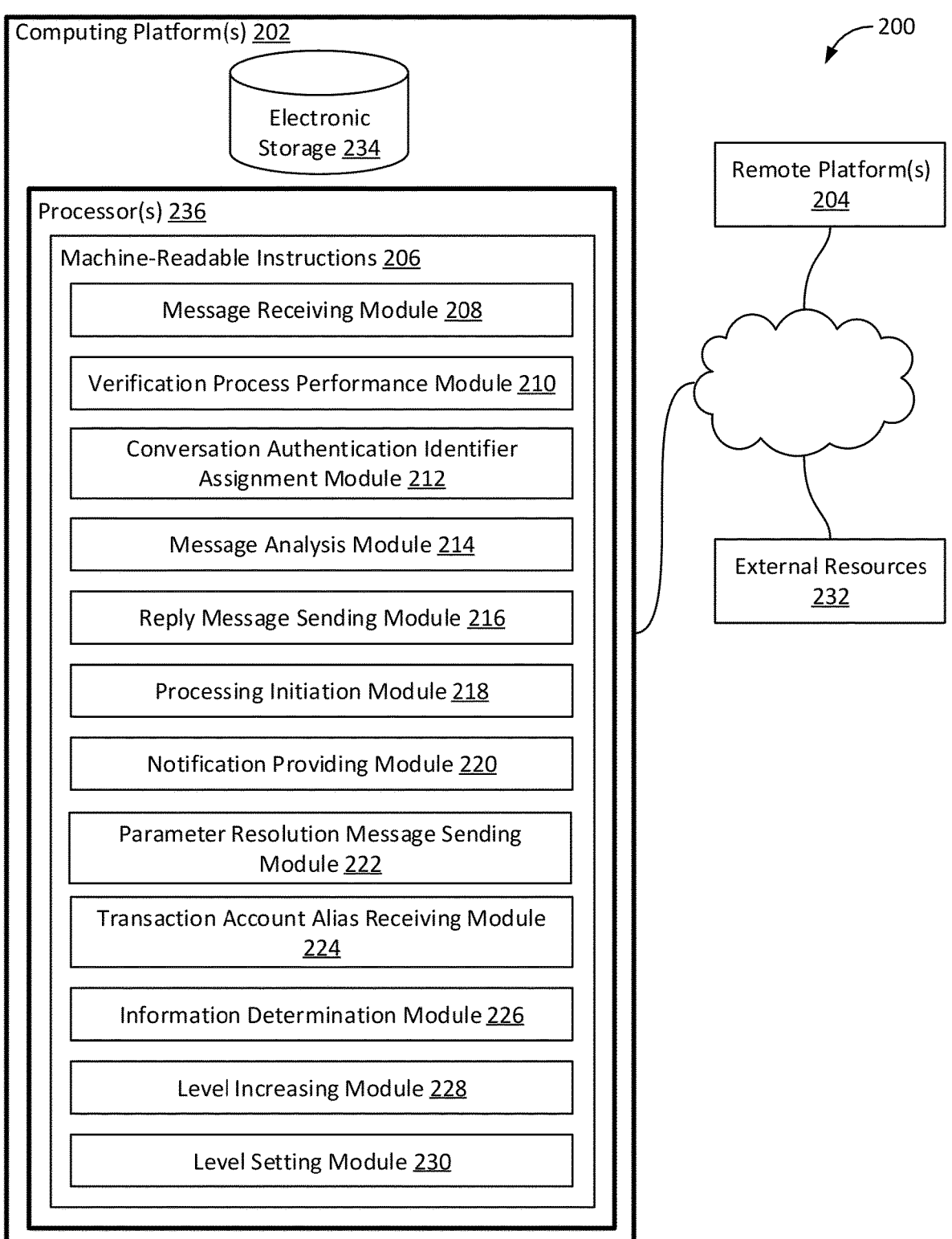
FIG. 2 illustrates another system configured for processing instructions associated with one or more data transfers, in accordance with one or more embodiments.

FIG. 2 illustrates a system 200 configured for processing instructions associated with one or more data transfers, in accordance with one or more embodiments. In some embodiments, system 200 may include one or more computing platforms 202, such as a messaging server similar to the messaging server 130 of FIG. 1. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202, for example messaging server(s), may be configured by machine-readable instructions 206. Machine-readable instructions 206 may include one or more instruction modules. The instruction modules may include computer program modules. The instruction modules may include one or more of message receiving module 208, verification process performance module 210, conversation authentication identifier assignment module 212, message analysis module 214, reply message sending module 216, processing initiation module 218, notification providing module 220, parameter resolution message sending module 222, transaction account alias receiving module 224, information determination module 226, level increasing module 228, level setting module 230, and/or other instruction modules.

Message receiving module 208 may be configured to receive, at a messaging server and from a computing device, a first unauthenticated message including data transfer instructions associated with the one or more data transfers. The messaging server may include an email server. The data transfer instructions may include transaction instructions. Receiving the first unauthenticated message may include receiving privacy-enhanced data transfer instructions, for example data transfer instructions that omit sensitive, private or personal information, such as account numbers. Receiving the first unauthenticated message may include receiving the privacy-enhanced data transfer instructions including one or more transaction account aliases, for example an alias or nickname for a bank account or other account involved in the data transfer. Message receiving module 208 may initiate determination of sensitive account-identifying information associated with the anonymized transaction account details. Authenticating the computing device may be performed using a chosen data transfer-specific authentication method from among a plurality of available authentication methods.

Verification process performance module 210 may be configured to perform, by the messaging server, a verification process, such as an authentication or authorization process, to authenticate the computing device in order to authenticate the data transfer instructions. By way of non-limiting example, performing the verification process may include performing an authentication selected from the group consisting of multi-factor authentication, two-factor authentication, device authentication, short messaging service authentication, one-time password authentication, email-based authentication, security token authentication, biometric authentication, location-based authentication, password-based authentication, and PIN-based authentication.

Performing the verification process may include performing a data transfer-specific, or transaction-specific, verification process. The process may include: providing, to the computing device, the choice of the plurality of authentication methods, which may occur prior to initiating the verification process. The data transfer-specific verification process may be selected by a customer associated with the computing device 110 for the specific transaction, as a means by which to add security to the transaction. When the verification process is varied from one transaction to another, it is more difficult to intercept or otherwise interfere with the transaction. For example, suppose SMS authentication is typically performed, and a bad actor attempting to foil a data transfer; if biometric authentication has been assigned for that specific data transfer, the bad actor will have difficulty spoofing a verification process, if the bad actor is expecting SMS authentication. By way of non-limiting example, the chosen authentication method may be selected from the group consisting of device authentication, short messaging service authentication, one-time password authentication, authentication via a network of trusted contacts, email-based authentication, security token authentication, biometric authentication, location-based authentication, password-based authentication, and PIN-based authentication. Performing the verification process may include authenticating the computing device using a chosen authentication method from among the plurality of authentication methods.

Conversation authentication identifier assignment module 212 may be configured to assign, by the messaging server and based on authenticating the computing device, a conversation authentication identifier to the first unauthenticated message received from the computing device. Conversation authentication identifier assignment module 212 may be configured to automatically assign, by the messaging server, the same conversation authentication identifier to subsequent unauthenticated messages between the computing device and the messaging server that are associated with the one or more data transfers. The first unauthenticated message and the subsequent unauthenticated messages may include email messages.

Message analysis module 214 may be configured to analyze, at the messaging server, the subsequent unauthenticated messages to determine whether the subsequent unauthenticated messages are associated with the one or more data transfers.

Reply message sending module 216 may be configured to send, via or by the messaging server, one or more reply messages to the computing device, for example one or more email messages. The one or more reply messages may include the conversation authentication identifier, for example to unify a thread of messages in a conversation with an authenticated computing device associated with a customer. The messaging server may be associated with an institution or organization in relation to which the one or more data transfers are to be performed. The messaging server may host one or more messaging accounts associated with an institution in relation to which the one or more data transfers are to be performed.

Processing initiation module 218 may be configured to initiate secure processing of the one or more data transfers based on the data transfer instructions and based on successful authentication of the computing device via the verification process. Processing initiation module 218 may be configured to initiate secure processing of the one or more data transfers based on the privacy-enhanced data transfer instructions and based on a determination of the sensitive account-identifying information associated with the privacy-enhanced transaction account details. Processing initiation module 218 may be configured to initiate secure processing of the one or more data transfers based on the privacy-enhanced data transfer instructions and based on the determination of the sensitive account-identifying information associated with the privacy-enhanced transaction account details. The privacy-enhanced data transfer instructions may include anonymized transaction account details that are sufficient to enable execution of the data transfer instructions in the absence of including sensitive account-identifying information in the data transfer instructions. Processing initiation module 218 may initiate determination of sensitive account-identifying information associated with the anonymized transaction account details.

Notification providing module 220 may be configured to provide, by the messaging server and in response to determining the at least one unambiguous intent, a notification to the computing device confirming initiation at least one of the one or more data transfers.

Parameter resolution message sending module 222 may be configured to send a parameter resolution message to the computing device to resolve the ambiguous parameter. The parameter resolution message may be sent by the messaging server and based on an indication, for example from the NLP engine 180 in FIG. 1, of at least one ambiguous parameter relating to the one or more data transfers. The parameter resolution message may be any message configured to obtain additional data relating to the at least one ambiguous parameter, so that the parameter is no longer ambiguous and the ambiguity is resolved. For example, if data transfer instructions include: "send the updated project spreadsheet to my boss", the expression "my boss" may be considered an ambiguous parameter if the system performing the data transfer has no prior data regarding the initiating party's work relationships.

Transaction account alias receiving module 224 may be configured to receive, at a transaction account processor, the one or more transaction account aliases. The transaction account processor may be a processor configured to resolve aliases relating to transaction accounts. The one or more transaction account aliases may include a transaction account nickname (e.g. Mom's chequing account, my Amazon account, etc.) associated with a sending account or a receiving account.

Information determination module 226 may be configured to determine, by the transaction account processor, the sensitive account-identifying information associated with the one or more transaction account aliases.

Performing the verification process may include varying a level of assurance, such as a level of comfort or permissible risk tolerance, associated with the verification process based on the data transfer instructions in the first unauthenticated message. For example, when the data transfer comprises a transaction, level increasing module 228 may be configured to increase the level of assurance associated with the verification process based on a transaction amount included in the data transfer instructions exceeding a stored threshold transaction amount. Level increasing module 228 may be configured to increase the level of assurance associated with the verification process based on a transaction type included in the data transfer instructions matching a stored higher-assurance transaction type, for example an electronic funds transfer.

Level setting module 230 may be configured to set the level of assurance at a high level of assurance based on an absence of a prior authentication status associated with the computing device. Level setting module 230 may be configured to set the level of assurance at a low level of assurance based on a stored successful prior authentication status associated with the computing device.

Referring further to embodiments including the NLP engine 160 as shown in FIG. 1, such embodiments may provide a novel approach to processing and parsing a composite conversation, even a series of paragraphs. When the processing is unambiguous for one or more transactions, the unambiguous transactions may be directly fulfilled. In an example implementation, a computing device is configured to perform a computer-implemented method, for example in relation to NLP engine associated with a data transfer organization or financial institution, and one or more NLP fulfillment engines.

The computer-implemented method may provide the following features/steps for processing instructions associated with one or more data transfers. The method may include receiving, at a messaging server and from a computing device, a first unauthenticated message including data transfer instructions associated with the one or more data transfers, the data transfer instructions including natural language statements. The method may include receiving, at a natural language processing (NLP) engine, the data transfer instructions including the natural language statements; performing, at the NLP engine, intent and entity analysis based on the data transfer instructions; determining, at the NLP engine and based on the intent and entity analysis, a plurality of intents, each of the plurality of intents having associated therewith one or more related entities; creating, at the NLP engine, data transfer execution instructions for at least one unambiguous data transfer associated with the plurality of intents; and instructing, by the NLP engine, performance of the data transfer associated with the data transfer instructions for the at least one unambiguous intent.

Receiving the first unauthenticated message may include receiving data transfer instructions including natural language statements associated with the one or more data transfers. Initiating secure processing of the one or more data transfers may include sending, by the messaging server and to a natural language processing engine, the natural language statements to determine at least one unambiguous intent associated with performance of the one or more data transfers.

Receiving the first unauthenticated message may include receiving data transfer instructions including natural language statements associated with the one or more data transfers. Initiating secure processing of the one or more data transfers may include sending, by the messaging server and to a natural language processing engine, the natural language statements for intent and entity analysis to determine at least one unambiguous intent associated with the natural language statements from among a plurality of identified intents. The one or more data transfers may include one or more financial transactions. Providing, to the computing device, a choice of a plurality of authentication methods for the one or more data transfers associated with the same conversation authentication identifier.

For any ambiguous transactions, the NLP engine carries on a conversation with the customer. Messaging is performed by the NLP Engine, not a person. In an optional aspect, as described above in relation to the second computing device 190, the NLP engine may temporarily hand off the process, for example to an employee, if the NLP is unable to complete process, then return it back to NLP after the employee helps to resolve the ambiguity and provide missing information.

In an aspect, the NLP Engine is trained with supervised training. The training teaches the NLP engine about the composite structure for example by providing training, then providing test data. Training could include, for example, that the use of the term "move" in a transaction instruction maps to the use of the term "send" when transferring money.

Composite intents and entities can be provided in one message, or in separate messages with their own intents and entities. Depending on the nature of the request, e.g. sending money, this can trigger an additional authorization step. For example, the message may go back via UAP 140 in FIG. 1 to the customer for authentication (ask for push notification, OTP). NLP fulfillment engine may interact with or run APIs to fulfill the transaction.

Example embodiments may use an NLP approach, and/or transfer or transition to a form-based approach. For example, the NLP engine may break apart a series of paragraphs, split them off and send back a confirmation email with a pre-filled form, for example with any missing information, as alternative to getting employee involved.

In an implementation, the customer may not respond with natural language, and may instead pre-fill a form. For example, the system may send a push notification to the customer, such as via a mobile app notification. When the customer taps on the push notification, it takes the customer into a mobile app associated with the requested data transfer, for example a mobile transaction app or banking app. The notification can include a deep link (with hidden json data) which, when selected, opens the mobile app and pre-fills a form for the customer to complete the transaction. In another embodiment, instead of a push notification, the system may send a deep link into an email message or SMS. In an example, the customer may complete missing information after clicking on the deep link that takes the customer directly to a data transfer screen, such as a money movement screen, pre-filled with the information provided. Alternatively, the NLP may determine something is missing, and send one or more push notifications to take the customer into the series of screens to resolve one or more ambiguous parameters.

Another example of fulfilling data transfer instructions is to provide instructions to look through transaction history (e.g. in response to a natural language request such as: "list all of my credit card spending at Costco"). The NLP engine may respond back with a spreadsheet, or series of transaction details (CSV file, PDF), for example after looking through a plurality of accounts, or transactions associated with different credit cards. In another implementation, transactions are pushed to an external data source, such as Google Drive, based on NLP. For example, the NLP instructions: "send all transactions from yesterday to my Google drive"

may be provided after the customer device has performed pre-registration and provided instructions on how to connect to the Google Drive account. The system may also send copies of receipts, cheque photos, etc.

In some embodiments, computing platform(s) 202, remote platform(s) 204, and/or external resources 232 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 232 may be operatively linked via some other communication media.

A given remote platform 204 may include one or more processors configured to execute computer program modules. The computer program modules may be configured to enable an expert or user associated with the given remote platform 204 to interface with system 200 and/or external resources 232, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 232 may include sources of information outside of system 200, external entities participating with system 200, and/or other resources. In some embodiments, some or all of the functionality attributed herein to external resources 232 may be provided by resources included in system 200.

Computing platform(s) 202 may include electronic storage 234, one or more processors 236, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 234 may comprise non-transitory storage media that electronically stores information. The electronic storage media of electronic storage 234 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 234 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 234 may include one or more virtual storage resources (e.g., cloud storage, a virtual private network, and/or other virtual storage resources). Electronic storage 234 may store software algorithms, information determined by processor(s) 236, information received from computing platform(s) 202, information received from remote platform(s) 204, and/or other information that enables computing platform(s) 202 to function as described herein.

Processor(s) 236 may be configured to provide information processing capabilities in computing platform(s) 202. As such, processor(s) 236 may include one or more of a digital processor, an analog processor, a digital circuit designed to process information, an analog circuit designed to process information, a state machine, and/or other mechanisms for electronically processing information. Although processor(s) 236 is shown in FIG. 2 as a single entity, this is for illustrative purposes only. In some embodiments, processor(s) 236 may include a plurality of processing units. These processing units may be physically located within the same device, or processor(s) 236 may represent processing functionality of a plurality of devices operating in coordination. Processor(s) 236 may be configured to execute modules 208, 210, 212, 214, 216, 218, 220, 222, 224, 226, 228, and/or 230, and/or other modules. Processor(s) 236 may be configured to execute modules 208, 210, 212, 214, 216, 218, 220, 222, 224, 226, 228, and/or 230, and/or other modules by software; hardware; firmware; some combination of software, hardware, and/or firmware; and/or other mechanisms for configuring processing capabilities on processor(s) 236. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, 220, 222, 224, 226, 228, and/or 230 are illustrated in FIG. 2 as being implemented within a single processing unit, in embodiments in which processor(s) 236 includes multiple processing units, one or more of modules 208, 210, 212, 214, 216, 218, 220, 222, 224, 226, 228, and/or 230 may be implemented remotely from the other modules. The description of the functionality provided by the different modules 208, 210, 212, 214, 216, 218, 220, 222, 224, 226, 228, and/or 230 described below is for illustrative purposes, and is not intended to be limiting, as any of modules 208, 210, 212, 214, 216, 218, 220, 222, 224, 226, 228, and/or 230 may provide more or less functionality than is described. For example, one or more of modules 208, 210, 212, 214, 216, 218, 220, 222, 224, 226, 228, and/or 230 may be eliminated, and some or all of its functionality may be provided by other ones of modules 208, 210, 212, 214, 216, 218, 220, 222, 224, 226, 228, and/or 230. As another example, processor(s) 236 may be configured to execute one or more additional modules that may perform some or all of the functionality attributed below to one of modules 208, 210, 212, 214, 216, 218, 220, 222, 224, 226, 228, and/or 230.

FIG. 3 illustrates a method 300 for processing instructions associated with one or more data transfers, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/ or software to be specifically designed for execution of one or more of the operations of method 300.

An operation 302 may include receiving, at a messaging server and from a computing device, a first unauthenticated message including data transfer instructions associated with the one or more data transfers. Operation 302 may be performed by one or more hardware processors configured by machine-readable instructions including a module that is the same as or similar to message receiving module 208, in accordance with one or more embodiments.

An operation 304 may include performing, by the messaging server, a verification process to authenticate the computing device in order to authenticate the data transfer instructions. Operation 304 may be performed by one or more hardware processors configured by machine-readable instructions including a module that is the same as or similar to verification process performance module 210, in accordance with one or more embodiments.

An operation 306 may include assigning, by the messaging server and based on authenticating the computing device, a conversation authentication identifier to the first unauthenticated message received from the computing device. Operation 306 may be performed by one or more hardware processors configured by machine-readable instructions including a module that is the same as or similar to conversation authentication identifier assignment module 212, in accordance with one or more embodiments.

An operation 308 may include automatically assigning, by the messaging server, the same conversation authentication identifier to subsequent unauthenticated messages between the computing device and the messaging server that are associated with the one or more data transfers. Operation 308 may be performed by one or more hardware processors configured by machine-readable instructions including a module that is the same as or similar to conversation authentication identifier assignment module 212, in accordance with one or more embodiments.

Figure 4:
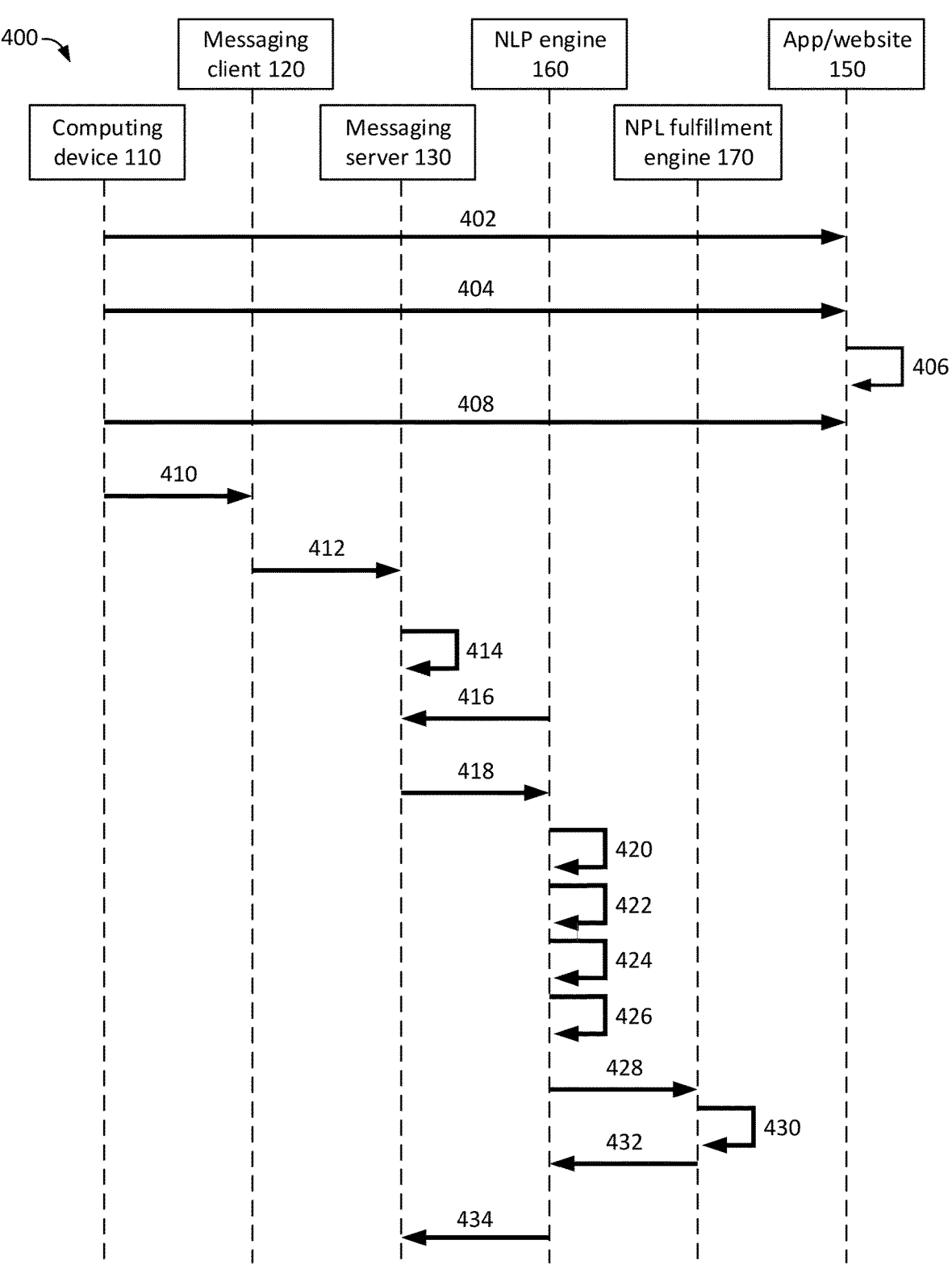
FIG. 4 illustrates another method for processing instructions associated with one or more data transfers, in accordance with one or more embodiments.

FIG. 4 illustrates another method for processing instructions associated with one or more data transfers, in accordance with one or more embodiments. The operations in FIG. 4 are illustrated as being performed in relation to the system elements shown in FIG. 1, and in another embodiment may be performed in relation to the system elements shown in FIG. 2.

Operations 402, 404, 406 and 408 relate to identifying an existing user or customer, or registering a new user or customer, and authenticating the user, such as using 2-factor authentication, e.g. OTP. In an implementation of operation 402, a pre-existing customer provides existing login credentials, such as a phone number or email address or username, to log in to UAP. Alternatively, in operation 404, a new user provides new login credentials for providing data transfer instructions, such as an email address or phone number, to be registered for email or SMS communication, or an app push token may be used. In operation 406, a 2-factor authentication message is sent, such as sending a one-time password via SMS or push, for example using UAP 140 as shown in FIG. 1, or other means. In operation 408, the customer enters the OTP for verification purposes, which can also increase security and comfort.

Operations 410, 412 and 414 include a computing device 110 sending a message via a messaging client 120 to a messaging server 130. In an example implementation, the operations include a customer sending an email to a secure email server, such as at a financial institution, and performing basic security validation. In an example implementation, operation 410 comprises sending instructions to a secure email system. The instructions may be to transfer a file, send money, or to perform some other data transfer or transaction. In operation 412, a message such as an email message is sent from the messaging client 120 to the messaging server 130. In operation 414, in an example implementation, the messaging server 130 performs basic security validation, for example to prevent SQL injection or to protect against a known set of bad actor emails.

In operation 416, NLP engine 160 calls the messaging server 130 to retrieve prior emails, or data associated with prior emails, for the customer identified in the previous steps. The data provided in a response from the messaging server 130 can include email body, subject, etc., and optionally images, such as images of cheques to be deposited. In an embodiment, the messaging server 130 is an email server and uses a context ID of the email server/system to maintain the underlying conversation and to assign a conversation authentication identifier to the received unauthenticated message. In operation 418, the messaging server 130 sends the requested data to the NLP engine 160.

Starting at operation 418, the NLP engine may perform various functions, such as sentiment analysis. In an example implementation, a first step comprises parsing text and temporarily storing documents in a holding area.

Operation 420 comprises parsing the obtained data, and initiating intent and entity analysis. A context ID may be obtained, or created, and may be used as the conversation authentication identifier. In operation 422, a customer lookup is performed to determine if a conversation authentication identifier or context ID exists for this conversation and this customer. In operation 424, the message or email is stored in a data store accessible to the NLP engine 160. In operation 426, the NLP engine extracts, from the obtained data, intent and entity data, and determines which fulfillment endpoint to call. In operation 428, a request is made to the NLP fulfillment engine 170 if and only if the method knows, or has been able to extract/assess, the customer intent, at least within a defined degree of certainty. If not, the customer is notified.

In operation 430, the NLP fulfillment engine 170 performs tasks, for example using calls to various APIs, for example after maintaining a conversation authentication identifier in a shared data store. In operation 432, if the API calls to downstream systems of the data transfer organization or financial institution, a notification is sent to the customer to confirm that the transaction has been successfully processed. The notification may be a rich HTML email, pure text email or SMS message, a message over a different messaging platform based on stored customer data, or a push notification via an associated app for the financial institution. In operation 434, the NLP engine provides formatted data back to the email server to send the confirmation email/notification to the customer. The formatted data may be sent over push notification systems such as APNS (Apple Push Notification Service), Firebase Cloud Messaging (Google), Facebook Messenger, or other suitable systems over which a message or notification may be provided.

Embodiments have been described in relation to a computing platform, for example a messaging server, configured for processing instructions associated with one or more data transfers. In an example embodiment, the data transfer comprises a financial transaction. According to known approaches, a customer cannot perform banking via email, and a financial institution has no means to verify customers or to process a "thread" of emails from a customer. A messaging server, such as an email server, according to an example embodiment of the present disclosure authenticates a computing device associated with a customer, and assigns a conversation authentication identifier to a first email message received from the customer's device. The server then automatically assigns the same conversation authentication identifier to subsequent email messages between the customer and the server that are associated with the same transaction.

Embodiments of the present disclosure can provide one or more of the following advantages: better customer experience; enabling data transfers using unauthenticated messaging, such as email banking using existing email clients; and expanded offerings to users or customers to securely send data transfer instructions, such as financial transaction instructions.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following clauses, with specific features laid out in the dependent clauses.

One aspect of the present disclosure relates to a computing platform, for example a messaging server, configured for processing instructions associated with one or more data transfers. The computing platform may include a non-transient computer-readable storage medium having executable instructions embodied thereon. The computing platform may include one or more hardware processors configured to execute the instructions. The processor(s) may execute the instructions to receive, at a messaging server and from a computing device, a first unauthenticated message including data transfer instructions associated with the one or more data transfers. The processor(s) may execute the instructions to perform, by the messaging server, a verification process to authenticate the computing device in order to authenticate the data transfer instructions. The processor(s) may execute the instructions to assign, by the messaging server and based on authenticating the computing device, a conversation authentication identifier to the first unauthenticated message received from the computing device. The processor(s) may execute the instructions to automatically assign, by the messaging server, the same conversation authentication identifier to subsequent unauthenticated messages between the computing device and the messaging server that are associated with the one or more data transfers.

In some implementations of the computing platform, the processor(s) may execute the instructions to analyze, at the messaging server, the subsequent unauthenticated messages to determine whether the subsequent unauthenticated messages are associated with the one or more data transfers.

In some implementations of the computing platform, the processor(s) may execute the instructions to send, via the messaging server, one or more reply messages to the computing device. In some implementations of the computing platform, the one or more reply messages may include the conversation authentication identifier.

In some implementations of the computing platform, the messaging server may be associated with an institution in relation to which the one or more data transfers are to be performed.

In some implementations of the computing platform, the messaging server may host one or more messaging accounts associated with an institution in relation to which the one or more data transfers are to be performed.

In some implementations of the computing platform, the messaging server may include an email server. In some implementations of the computing platform, the first unauthenticated message and the subsequent unauthenticated messages may include email messages.

In some implementations of the computing platform, performing the verification process may include performing an authentication selected from the group consisting of multi-factor authentication, two-factor authentication, device authentication, short messaging service authentication, one-time password authentication, authentication via a network of trusted contacts, email-based authentication, security token authentication, biometric authentication, location-based authentication, password-based authentication, and pin-based authentication.

In some implementations of the computing platform, the processor(s) may execute the instructions to initiate secure processing of the one or more data transfers based on the data transfer instructions and based on successful authentication of the computing device via the verification process.

In some implementations of the computing platform, receiving the first unauthenticated message may include receiving data transfer instructions including natural language statements associated with the one or more data transfers. In some implementations of the computing platform, initiating secure processing of the one or more data transfers may include sending, by the messaging server and to a natural language processing engine, the natural language statements to determine at least one unambiguous intent associated with performance of the one or more data transfers.

In some implementations of the computing platform, the processor(s) may execute the instructions to provide, by the messaging server and in response to determining the at least one unambiguous intent, a notification to the computing device confirming initiation at least one of the one or more data transfers.

In some implementations of the computing platform, the processor(s) may execute the instructions to send, by the messaging server and based on an indication from the NLP engine of at least one ambiguous parameter relating to the one or more data transfers, a parameter resolution message to the computing device to resolve the ambiguous parameter.

In some implementations of the computing platform, receiving the first unauthenticated message may include receiving data transfer instructions including natural language statements associated with the one or more data transfers. In some implementations of the computing platform, initiating secure processing of the one or more data transfers may include sending, by the messaging server and to a natural language processing engine, the natural language statements for intent and entity analysis to determine at least one unambiguous intent associated with the natural language statements from among a plurality of identified intents. In some implementations of the computing platform, each of the plurality of identified intents may have associated therewith one or more related entities.

In some implementations of the computing platform, the one or more data transfers may include one or more financial transactions. In some implementations of the computing platform, the data transfer instructions may include transaction instructions.

In some implementations of the computing platform, receiving the first unauthenticated message may include receiving privacy-enhanced data transfer instructions. In some implementations of the computing platform, the privacy-enhanced data transfer instructions may include anonymized transaction account details that are sufficient to enable execution of the data transfer instructions in the absence of including sensitive account-identifying information in the data transfer instructions. In some implementations of the computing platform, the processor(s) may execute the instructions to initiate determination of sensitive account-identifying information associated with the anonymized transaction account details.

In some implementations of the computing platform, the processor(s) may execute the instructions to initiate secure processing of the one or more data transfers based on the privacy-enhanced data transfer instructions and based on a determination of the sensitive account-identifying information associated with the privacy-enhanced transaction account details.

In some implementations of the computing platform, receiving the first unauthenticated message may include receiving the privacy-enhanced data transfer instructions including one or more transaction account aliases.

In some implementations of the computing platform, the processor(s) may execute the instructions to receive, at a transaction account processor, the one or more transaction account aliases. In some implementations of the computing platform, the processor(s) may execute the instructions to determine, by the transaction account processor, the sensitive account-identifying information associated with the one or more transaction account aliases.

In some implementations of the computing platform, the processor(s) may execute the instructions to initiate secure processing of the one or more data transfers based on the privacy-enhanced data transfer instructions and based on the determination of the sensitive account-identifying information associated with the privacy-enhanced transaction account details.

In some implementations of the computing platform, the one or more transaction account aliases may include a transaction account nickname associated with a sending account or a receiving account.

In some implementations of the computing platform, performing the verification process may include varying a level of assurance associated with the verification process based on the data transfer instructions in the first unauthenticated message.

In some implementations of the computing platform, the processor(s) may execute the instructions to increase the level of assurance associated with the verification process based on a transaction amount included in the data transfer instructions exceeding a stored threshold transaction amount.

In some implementations of the computing platform, the processor(s) may execute the instructions to increase the level of assurance associated with the verification process based on a transaction type included in the data transfer instructions matching a stored higher-assurance transaction type.

In some implementations of the computing platform, the processor(s) may execute the instructions to set the level of assurance at a high level of assurance based on an absence of a prior authentication status associated with the computing device.

In some implementations of the computing platform, the processor(s) may execute the instructions to set the level of assurance at a low level of assurance based on a stored successful prior authentication status associated with the computing device.

In some implementations of the computing platform, performing the verification process may include providing, to the computing device, a choice of a plurality of authentication methods for the verification process. In some implementations of the computing platform, performing the verification process may include authenticating the computing device using a chosen authentication method from among the plurality of authentication methods.

In some implementations of the computing platform, performing the verification process may include performing a data transfer-specific verification process and includes providing, to the computing device, a choice of a plurality of authentication methods for the one or more data transfers associated with the same conversation authentication identifier. In some implementations of the computing platform, authenticating the computing device may be performed using a chosen data transfer-specific authentication method from among the plurality of authentication methods.

In some implementations of the computing platform, providing, to the computing device, the choice of the plurality of authentication methods may occur prior to initiating the verification process.

In some implementations of the computing platform, providing, to the computing device, the choice of the plurality of authentication methods may occur prior to initiating the verification process.

In some implementations of the computing platform, the chosen authentication method may be selected from the group consisting of device authentication, short messaging service authentication, one-time password authentication, authentication via a network of trusted contacts, email-based authentication, security token authentication, biometric authentication, location-based authentication, password-based authentication, and pin-based authentication. One aspect of the present disclosure relates to a system configured for processing instructions associated with one or more data transfers. The system may include one or more hardware processors configured by machine-readable instructions. The processor(s) may be configured to receive, at a messaging server and from a computing device, a first unauthenticated message including data transfer instructions associated with the one or more data transfers. The processor(s) may be configured to perform, by the messaging server, a verification process to authenticate the computing device in order to authenticate the data transfer instructions. The processor(s) may be configured to assign, by the messaging server and based on authenticating the computing device, a conversation authentication identifier to the first unauthenticated message received from the computing device. The processor(s) may be configured to automatically assign, by the messaging server, the same conversation authentication identifier to subsequent unauthenticated messages between the computing device and the messaging server that are associated with the one or more data transfers.

Another aspect of the present disclosure relates to a method for processing instructions associated with one or more data transfers. The method may include receiving, at a messaging server and from a computing device, a first unauthenticated message including data transfer instructions associated with the one or more data transfers. The method may include performing, by the messaging server, a verification process to authenticate the computing device in order to authenticate the data transfer instructions. The method may include assigning, by the messaging server and based on authenticating the computing device, a conversation authentication identifier to the first unauthenticated message received from the computing device. The method may include automatically assigning, by the messaging server, the same conversation authentication identifier to subsequent unauthenticated messages between the computing device and the messaging server that are associated with the one or more data transfers.

In some implementations of the method, it may include analyzing, at the messaging server, the subsequent unauthenticated messages to determine whether the subsequent unauthenticated messages are associated with the one or more data transfers.

In some implementations of the method, it may include sending, via the messaging server, one or more reply messages to the computing device. In some implementations of the method, the one or more reply messages may include the conversation authentication identifier.

In some implementations of the method, the messaging server may be associated with an institution in relation to which the one or more data transfers are to be performed.

In some implementations of the method, the messaging server may host one or more messaging accounts associated with an institution in relation to which the one or more data transfers are to be performed.

In some implementations of the method, the messaging server may include an email server. In some implementations of the method: receiving the first unauthenticated message comprises receiving a first email message; assigning the conversation authentication identifier to the first unauthenticated message comprises assigning the conversation authentication identifier to the first email message; and automatically assigning the same conversation authentication identifier to subsequent unauthenticated messages comprises automatically assigning the same conversation authentication identifier to subsequent email messages.

In some implementations of the method, performing the verification process may include performing an authentication selected from the group consisting of multi-factor authentication, two-factor authentication, device authentication, short messaging service authentication, one-time password authentication, authentication via a network of trusted contacts, email-based authentication, security token authentication, biometric authentication, location-based authentication, password-based authentication, and pin-based authentication.

In some implementations of the method, it may include initiating secure processing of the one or more data transfers based on the data transfer instructions and based on successful authentication of the computing device via the verification process.

In some implementations of the method, receiving the first unauthenticated message may include receiving data transfer instructions including natural language statements associated with the one or more data transfers. In some implementations of the method, initiating secure processing of the one or more data transfers may include sending, by the messaging server and to a natural language processing engine, the natural language statements to determine at least one unambiguous intent associated with performance of the one or more data transfers.

In some implementations of the method, it may include providing, by the messaging server and in response to determining the at least one unambiguous intent, a notification to the computing device confirming initiation at least one of the one or more data transfers.

In some implementations of the method, it may include sending, by the messaging server and based on an indication from the NLP engine of at least one ambiguous parameter relating to the one or more data transfers, a parameter resolution message to the computing device to resolve the ambiguous parameter.

In some implementations of the method, receiving the first unauthenticated message may include receiving data transfer instructions including natural language statements associated with the one or more data transfers. In some implementations of the method, initiating secure processing of the one or more data transfers may include sending, by the messaging server and to a natural language processing engine, the natural language statements for intent and entity analysis to determine at least one unambiguous intent associated with the natural language statements from among a plurality of identified intents. In some implementations of the method, each of the plurality of identified intents may have associated therewith one or more related entities.

In some implementations of the method, the one or more data transfers may include one or more financial transactions. In some implementations of the method, the data transfer instructions may include transaction instructions.

In some implementations of the method, receiving the first unauthenticated message may include receiving privacy-enhanced data transfer instructions. In some implementations of the method, the privacy-enhanced data transfer instructions may include anonymized transaction account details that are sufficient to enable execution of the data transfer instructions in the absence of including sensitive account-identifying information in the data transfer instructions. In some implementations of the method, it may include initiating determination of sensitive account-identifying information associated with the anonymized transaction account details.

In some implementations of the method, it may include initiating secure processing of the one or more data transfers based on the privacy-enhanced data transfer instructions and based on a determination of the sensitive account-identifying information associated with the privacy-enhanced transaction account details.

In some implementations of the method, receiving the first unauthenticated message may include receiving the privacy-enhanced data transfer instructions including one or more transaction account aliases.

In some implementations of the method, it may include receiving, at a transaction account processor, the one or more transaction account aliases. In some implementations of the method, it may include determining, by the transaction account processor, the sensitive account-identifying information associated with the one or more transaction account aliases.

In some implementations of the method, it may include initiating secure processing of the one or more data transfers based on the privacy-enhanced data transfer instructions and based on the determination of the sensitive account-identifying information associated with the privacy-enhanced transaction account details.

In some implementations of the method, the one or more transaction account aliases may include a transaction account nickname associated with a sending account or a receiving account.

In some implementations of the method, performing the verification process may include varying a level of assurance associated with the verification process based on the data transfer instructions in the first unauthenticated message.

In some implementations of the method, it may include increasing the level of assurance associated with the verification process based on a transaction amount included in the data transfer instructions exceeding a stored threshold transaction amount.

In some implementations of the method, it may include increasing the level of assurance associated with the verification process based on a transaction type included in the data transfer instructions matching a stored higher-assurance transaction type.

In some implementations of the method, it may include setting the level of assurance at a high level of assurance based on an absence of a prior authentication status associated with the computing device.

In some implementations of the method, it may include setting the level of assurance at a low level of assurance based on a stored successful prior authentication status associated with the computing device.

In some implementations of the method, performing the verification process may include providing, to the computing device, a choice of a plurality of authentication methods for the verification process. In some implementations of the method, performing the verification process may include authenticating the computing device using a chosen authentication method from among the plurality of authentication methods.

In some implementations of the method, performing the verification process may include performing a data transfer-specific verification process and includes. In some implementations of the method, providing, to the computing device, a choice of a plurality of authentication methods for the one or more data transfers associated with the same conversation authentication identifier. In some implementations of the method, authenticating the computing device using a chosen data transfer-specific authentication method from among the plurality of authentication methods.

In some implementations of the method, providing, to the computing device, the choice of the plurality of authentication methods may occur prior to initiating the verification process.

In some implementations of the method, providing, to the computing device, the choice of the plurality of authentication methods may occur prior to initiating the verification process.

In some implementations of the method, the chosen authentication method may be selected from the group consisting of device authentication, short messaging service authentication, one-time password authentication, authentication via a network of trusted contacts, email-based authentication, security token authentication, biometric authentication, location-based authentication, password-based authentication, and pin-based authentication.

Yet another aspect of the present disclosure relates to a non-transient computer-readable storage medium having instructions embodied thereon, the instructions being executable by one or more processors to perform a method for processing instructions associated with one or more data transfers. The method may include receiving, at a messaging server and from a computing device, a first unauthenticated message including data transfer instructions associated with the one or more data transfers. The method may include performing, by the messaging server, a verification process to authenticate the computing device in order to authenticate the data transfer instructions. The method may include assigning, by the messaging server and based on authenticating the computing device, a conversation authentication identifier to the first unauthenticated message received from the computing device. The method may include automatically assigning, by the messaging server, the same conversation authentication identifier to subsequent unauthenticated messages between the computing device and the messaging server that are associated with the one or more data transfers. In some implementations of the computer-readable storage medium, the method may include one or more of the other aspects as described and illustrated herein.

A further aspect of the present disclosure relates to a system configured for processing instructions associated with one or more data transfers. The system may include one or more hardware processors configured to execute the instructions. The processor(s) may execute the instructions to receive, at a messaging server and from a computing device, a first unauthenticated message including data transfer instructions associated with the one or more data transfers. The processor(s) may execute the instructions to perform, by the messaging server, a verification process to authenticate the computing device in order to authenticate the data transfer instructions. The processor(s) may execute the instructions to assign, by the messaging server and based on authenticating the computing device, a conversation authentication identifier to the first unauthenticated message received from the computing device. The processor(s) may execute the instructions to automatically assign, by the messaging server, the same conversation authentication identifier to subsequent unauthenticated messages between the computing device and the messaging server that are associated with the one or more data transfers.

A first additional aspect of the present disclosure relates to a computing platform, for example a messaging server, configured for processing instructions associated with one or more data transfers. The computing platform may include a non-transient computer-readable storage medium having executable instructions embodied thereon. The computing platform may include one or more hardware processors configured to execute the instructions. The processor(s) may execute the instructions to receive, at a messaging server and from a computing device, an unauthenticated message including privacy-enhanced data transfer instructions associated with the one or more data transfers. The privacy-enhanced data transfer instructions may include anonymized transaction account details that are sufficient to enable execution of the data transfer instructions in the absence of sensitive account-identifying information in the data transfer instructions. The processor(s) may execute the instructions to perform, by the messaging server, a verification process to authenticate the computing device in order to authenticate the data transfer instructions. The processor(s) may execute the instructions to assign, by the messaging server and based on authenticating the computing device, a conversation authentication identifier to the first unauthenticated message received from the computing device. In some implementations of the computing platform, the processor(s) may execute the instructions to perform additional operations or steps according to one or more of the methods and other aspects as described and illustrated herein.

A second additional aspect of the present disclosure relates to a computing platform, for example a messaging server, configured for processing instructions associated with one or more data transfers. The computing platform may include a non-transient computer-readable storage medium having executable instructions embodied thereon. The computing platform may include one or more hardware processors configured to execute the instructions. The processor(s) may execute the instructions to receive, at a messaging server and from a computing device, a first unauthenticated message including data transfer instructions associated with the one or more data transfers. The processor(s) may execute the instructions to perform, by the messaging server, a verification process to authenticate the computing device in order to authenticate the data transfer instructions. The processor(s) may execute the instructions to vary a level of assurance associated with the verification process based on the data transfer instructions in the unauthenticated message. The processor(s) may execute the instructions to assign, by the messaging server and based on authenticating the computing device, a conversation authentication identifier to the first unauthenticated message received from the computing device. In some implementations of the computing platform, the processor(s) may execute the instructions to perform additional operations or steps according to one or more of the methods and other aspects as described and illustrated herein.

A third additional aspect of the present disclosure relates to a computing platform, for example a messaging server, configured for processing instructions associated with one or more data transfers. The computing platform may include a non-transient computer-readable storage medium having executable instructions embodied thereon. The computing platform may include one or more hardware processors configured to execute the instructions. The processor(s) may execute the instructions to receive, at a messaging server and from a computing device, a first unauthenticated message including data transfer instructions associated with the one or more data transfers. The processor(s) may execute the instructions to provide, via the computing device, a choice of a plurality of authentication methods for the one or more data transfers. The processor(s) may execute the instructions to perform, by the messaging server, a transaction-specific verification process using a chosen or received transaction-specific authentication method to authenticate the computing device in order to authenticate the data transfer instructions. The processor(s) may execute the instructions to assign, by the messaging server and based on authenticating the computing device, a conversation authentication identifier to the first unauthenticated message received from computing device. In some implementations of the computing platform, the processor(s) may execute the instructions to perform additional operations or steps according to one or more of the methods and other aspects as described and illustrated herein.

The invention claimed is:

1. A messaging server configured for processing instructions associated with one or more data transfers, the messaging server comprising:
   a non-transient computer-readable storage medium having executable instructions embodied thereon; and
   one or more hardware processors configured to execute the instructions to:
      assign, by a messaging server and in response to authentication of a computing device, a conversation authentication identifier to a first unauthenticated message received from the computing device, the first unauthenticated message including data transfer instructions associated with the one or more data transfers;
      analyze, by the messaging server, a subsequent unauthenticated message from the computing device to determine that the subsequent unauthenticated message is associated with the one or more data transfers; and
      automatically assign, by the messaging server, the same conversation authentication identifier to the subsequent unauthenticated message that is determined to be associated with the one or more data transfers,
   wherein the conversation authentication identifier indicates that the data transfer instructions are authenticated and that the first unauthenticated message and the subsequent unauthenticated message relate to the same one or more data transfers.

2. The messaging server of claim 1, wherein the one or more hardware processors are further configured by the instructions to:
   send, via the messaging server, one or more reply messages to the computing device, the one or more reply messages comprising the conversation authentication identifier.

3. The messaging server of claim 1, wherein:
   the messaging server comprises an email server; and
   the first unauthenticated message and the subsequent unauthenticated message comprise email messages.

4. The messaging server of claim 1, wherein the one or more hardware processors are further configured by the instructions to:
   authenticate, by the messaging server, the computing device in response to receipt of the first unauthenticated message including the data transfer instructions; and
   initiate secure processing of the one or more data transfers based on the data transfer instructions and based on successful authentication of the computing device.

5. The messaging server of claim 4, wherein authenticating the computing device comprises varying a level of assurance associated with the authenticating based on the data transfer instructions in the first unauthenticated message.

6. The messaging server of claim 1, wherein the instructions include natural language statements associated with the one or more data transfers, and wherein the one or more hardware processors are further configured to:

initiate secure processing of the one or more data transfers by sending, by the messaging server and to a natural language processing (NLP) engine, the natural language statements to determine at least one unambiguous intent associated with performance of the one or more data transfers.

7. The messaging server of claim 6, wherein the one or more hardware processors are further configured by the instructions to:

send, by the messaging server and based on an indication from the NLP engine of at least one ambiguous parameter relating to the one or more data transfers, a parameter resolution message to the computing device to resolve the ambiguous parameter.

8. The messaging server of claim 1, wherein the one or more hardware processors are further configured by the instructions to:

receive privacy-enhanced data transfer instructions including anonymized transaction account details that are sufficient to enable execution of the data transfer instructions in the absence of including sensitive account-identifying information in the data transfer instructions; and initiate determination of sensitive account-identifying information associated with the anonymized transaction account details.

9. The messaging server of claim 1, wherein the one or more hardware processors are further configured by the instructions to:

provide, to the computing device, a choice of a plurality of authentication methods for the one or more data transfers associated with the same conversation authentication identifier; and authenticate the computing device using a chosen data transfer-specific authentication method from among the plurality of authentication methods.

10. A computer-implemented method of processing instructions associated with one or more data transfers, the method comprising:

assigning, by a messaging server and in response to authentication of a computing device, a conversation authentication identifier a first unauthenticated message received from the computing device, the first unauthenticated message including data transfer instructions associated with the one or more data transfers;

analyzing, by the messaging server, a subsequent unauthenticated message from the computing device to determine that the subsequent unauthenticated message is associated with the one or more data transfers; and automatically assigning, by the messaging server, the same conversation authentication identifier to the subsequent unauthenticated message that is determined to be associated with the one or more data transfers, wherein the conversation authentication identifier indicates that the data transfer instructions are authenticated and that the first unauthenticated message and the subsequent unauthenticated message relate to the same one or more data transfers.

11. The method of claim 10, further comprising:

sending, via the messaging server, one or more reply messages to the computing device, the one or more reply messages comprising the conversation authentication identifier.

12. The method of claim 10, wherein the messaging server comprises an email server; and wherein:

receiving the first unauthenticated message comprises receiving a first email message;

assigning the conversation authentication identifier to the first unauthenticated message comprises assigning the conversation authentication identifier to the first email message; and automatically assigning the same conversation authentication identifier to the subsequent unauthenticated message comprises automatically assigning the same conversation authentication identifier to subsequent email messages.

13. The method of claim 10, further comprising:

authenticating, by the messaging server, the computing device in response to receipt of the first unauthenticated message including the data transfer instructions; and initiating secure processing of the one or more data transfers based on the data transfer instructions and based on successful authentication of the computing device.

14. The method of claim 13, wherein authenticating the computing device comprises varying a level of assurance associated with the authenticating based on the data transfer instructions in the first unauthenticated message.

15. The method of claim 13, further comprising:

providing, to the computing device, a choice of a plurality of authentication methods for the one or more data transfers associated with the same conversation authentication identifier; and authenticating the computing device using a chosen data transfer-specific authentication method from among the plurality of authentication methods.

16. The method of claim 10, wherein:

receiving the first unauthenticated message comprises receiving data transfer instructions including natural language statements associated with the one or more data transfers; and initiating secure processing of the one or more data transfers comprises sending, by the messaging server and to a natural language processing (NLP) engine, the natural language statements to determine at least one unambiguous intent associated with performance of the one or more data transfers.

17. The method of claim 16, further comprising:

sending, by the messaging server and based on an indication from the NLP engine of at least one ambiguous parameter relating to the one or more data transfers, a parameter resolution message to the computing device to resolve the ambiguous parameter.

18. The method of claim 10, further comprising:

receiving privacy-enhanced data transfer instructions, wherein the privacy-enhanced data transfer instructions include anonymized transaction account details that are sufficient to enable execution of the data transfer instructions in the absence of including sensitive account-identifying information in the data transfer instructions; and initiating determination of sensitive account-identifying information associated with the anonymized transaction account details.

19. A non-transient computer-readable storage medium having instructions embodied thereon, the instructions being executable by one or more processors to perform a method for processing instructions associated with one or more data transfers, the method comprising:

assigning, by a messaging server and in response to authentication of a computing device, a conversation authentication identifier a first unauthenticated message received from the computing device, the first unauthenticated message including data transfer instructions associated with the one or more data transfers;

analyzing, by the messaging server, a subsequent unauthenticated message from the computing device to determine that the subsequent unauthenticated message is associated with the one or more data transfers; and automatically assigning, by the messaging server, the same conversation authentication identifier to the subsequent unauthenticated message that is determined to be associated with the one or more data transfers, wherein the conversation authentication identifier indicates that the data transfer instructions are authenticated and that the first unauthenticated message and the subsequent unauthenticated message relate to the same one or more data transfers.

20. The computer-readable storage medium of claim 19, wherein the method further comprises:

providing, to the computing device, a choice of a plurality of authentication methods for the one or more data transfers associated with the same conversation authentication identifier; and authenticating the computing device using a chosen data transfer-specific authentication method from among the plurality of authentication methods.

* * * * *